US006944826B2

(12) United States Patent
Thornton

(10) Patent No.: US 6,944,826 B2
(45) Date of Patent: Sep. 13, 2005

(54) METHOD OF OPERATING A SYSTEM OF CO-LOCATED COMPUTERS AND REMOTE HUMAN INTERFACES

(75) Inventor: Barry W. Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 1 day.

(21) Appl. No.: 10/279,475

(22) Filed: Oct. 24, 2002

(65) Prior Publication Data

US 2004/0080526 A1 Apr. 29, 2004

(51) Int. Cl.[7] ................................................. G06F 3/00
(52) U.S. Cl. ....................... 715/733; 715/717; 715/740; 715/719; 709/217
(58) Field of Search ........................ 715/700, 716–719, 715/733, 740–743, 748, 751, 761, 764; 707/10; 709/201, 203–205, 217, 218

(56) References Cited

U.S. PATENT DOCUMENTS

| 4,885,718 | A |   | 12/1989 | Asprey et al. |         |
|-----------|---|---|---------|---------------|---------|
| 5,130,793 | A |   | 7/1992  | Bordry et al. |         |
| 5,193,200 | A |   | 3/1993  | Asprey et al. |         |
| 5,257,390 | A |   | 10/1993 | Asprey        |         |
| 5,268,676 | A |   | 12/1993 | Asprey et al. |         |
| 5,299,306 | A |   | 3/1994  | Asprey        |         |
| 5,311,302 | A | * | 5/1994  | Berry et al.  | 348/14.03 |
| 5,315,711 | A |   | 5/1994  | Barone et al. |         |
| 5,323,420 | A |   | 6/1994  | Asprey        |         |
| 5,353,409 | A |   | 10/1994 | Asprey et al. |         |
| 5,374,952 | A |   | 12/1994 | Flohr         |         |
| 5,386,574 | A |   | 1/1995  | Asprey        |         |
| 5,428,806 | A |   | 6/1995  | Pocrass       |         |
| 5,465,105 | A |   | 11/1995 | Shatas et al. |         |
| 5,504,540 | A |   | 4/1996  | Shatas        |         |
| 5,577,042 | A |   | 11/1996 | McGraw, Sr. et al. |    |
| 5,577,205 | A |   | 11/1996 | Hwang et al.  |         |
| 5,587,824 | A |   | 12/1996 | Asprey        |         |
| 5,841,977 | A | * | 11/1998 | Ishizaki et al. | 709/204 |
| 5,867,821 | A | * | 2/1999  | Ballantyne et al. | 705/2 |
| 5,884,096 | A |   | 3/1999  | Beasley et al. |        |
| 5,926,509 | A |   | 7/1999  | Stewart et al. |        |
| 6,047,054 | A | * | 4/2000  | Bayless et al. | 379/202.01 |
| 6,073,188 | A |   | 6/2000  | Fleming       |         |

(Continued)

FOREIGN PATENT DOCUMENTS

| KR | 2001106740 A | * | 12/2001 | ........... G06F/13/14 |
| WO | WO 95/00917  | * | 1/1995  | ........... G06F/15/62 |
| WO | WO 99/18533  | * | 4/1999  | ......... G06F/153/00  |

OTHER PUBLICATIONS

Oliver Baltuch et al, "The Future Trends of PC Card Host Controllers", 1995, IEEE, p. 148–152.*

(Continued)

*Primary Examiner*—X. L. Bautista
(74) *Attorney, Agent, or Firm*—Meyertons Hood Kivlin Kowert & Goetzel, P.C.; Jeffery C. Hood; Erik A. Heter

(57) ABSTRACT

A system and method for providing a consistent work environment to a plurality of users is disclosed. In one embodiment, the system may include a plurality of computing systems which are located at a common location and connected by a network. Each of a plurality of human interfaces may be coupled to one of the plurality of computing systems by a communications link. Each human interface is located at a user location. The user location may be remote from the plurality of computing systems. Each of the human interfaces may be operable to present to a user a graphical user interface for application software, a graphical user interface for conducting telephone calls with external parties, and a video window for displaying television programming.

20 Claims, 10 Drawing Sheets

U.S. PATENT DOCUMENTS

| | | | |
|---|---|---|---|
| 6,078,974 | A | 6/2000 | Kirshtein |
| 6,119,146 | A | 9/2000 | Heller et al. |
| 6,122,259 | A | 9/2000 | Ishida |
| 6,150,997 | A | 11/2000 | Asprey |
| 6,185,643 | B1 | 2/2001 | Kirshtein et al. |
| 6,219,695 | B1 | 4/2001 | Guttag et al. |
| 6,265,951 | B1 | 7/2001 | Kirshtein |
| 6,333,750 | B1 | 12/2001 | Odryna et al. |
| 6,363,452 | B1 | 3/2002 | Lach |
| 6,377,629 | B1 | 4/2002 | Stewart et al. |
| 6,378,001 | B1 | 4/2002 | Aditham et al. ............ 709/313 |
| 6,388,658 | B1 | 5/2002 | Ahern et al. |
| 6,389,029 | B1 | 5/2002 | McAlear |
| 6,412,031 | B1 * | 6/2002 | Grooters ...................... 710/36 |
| 6,418,494 | B1 | 7/2002 | Shatas et al. |
| 6,446,138 | B1 | 9/2002 | Criscolo et al. ................ 710/1 |
| 6,505,245 | B1 | 1/2003 | North et al. ................ 709/223 |
| 6,513,069 | B1 * | 1/2003 | Abato et al. ................ 709/238 |
| 6,539,438 | B1 | 3/2003 | Ledzius et al. |
| 6,544,174 | B2 * | 4/2003 | West et al. ................. 600/300 |
| 6,557,170 | B1 | 4/2003 | Wilder et al. |
| 6,564,274 | B1 | 5/2003 | Heath et al. |
| 6,564,378 | B1 * | 5/2003 | Satterfield et al. ............ 725/40 |
| 6,654,825 | B2 | 11/2003 | Clapp et al. |
| 2002/0056137 | A1 | 5/2002 | Stewart et al. |
| 2002/0091850 | A1 | 7/2002 | Perholtz et al. |
| 2002/0138682 | A1 | 9/2002 | Shatas et al. |

OTHER PUBLICATIONS

L. Y. Syromyatnikov et al, "Performance Analysis of Video Conferencing on Homogenous and Hetergenous Networks", 1996, IEEE, v2, p548–551.*

John Cox, "New breed of vendors embrace thin clients", 1998, Network World, pp. 1–3.*

Mickey Meece, "Plastic to be aboard when gaming takes flight", Jan. 1994, American Banker, v159, n5, p14(1).*

Patrick H. Hartley, "Cut Costs With Thin Client Computing", May 2001, School Planning and Management, v40, n5, p69.*

Microsoft Press Computer Dictionary, Microsoft, Third Edition, 1997, p. 75–76.*

Paul Cronin, "An Introduction to TSAPI and Network Telephony", 1996, IEEE, p. 48–54.*

Seok Soo Kim et al, "DooRae Distance Home Study System On DooRae Framework for Integrated Home Information Service" 1997, IEEE, pp. 75–78.*

I Okoth et al, "DVB–CI: Gateway to Truly Interactive Multimedia Environment", 1997, IEEE, pp. 465–469.*

A. Hastings et al, "ISDN Centrex Applications in a Large Multinational Company", 1992, IEEE, pp. 1737–1742.*

Paul Cronin, "An Introduction to TSAPI and Network Telephony", 1996, IEEE, pp. 48–54.*

Oliver Baltuch, "The Future Trends of PC Card Host Controllers", 1995, IEEE, pp. 148–152.*

International Search Report, Application No. PCT/US03/03793, mailed Jun. 24, 2003.

PCT Written Opinion, Application No. PCT/US03/03793, mailed Jul. 7, 2004.

* cited by examiner

METHOD OF OPERATING A SYSTEM OF CO-LOCATED COMPUTERS AND REMOTE HUMAN INTERFACES

BACKGROUND OF THE INVENTION

1. Field of the Invention

This invention relates generally to computer systems and more particularly to computing systems having a plurality of remote human interfaces.

2. Description of the Related Art

In modern day enterprises, there is a heavy demand for various types of information. Many various mediums are used to convey and process information as well as allow communication between people and places. Telephones and Internet e-mail enable two different methods by which people communicate with each other. The Internet may also be used to convey information to an end user using a medium such as the World Wide Web. Media such as 24-hour cable news channels conveys information to users watching a television set. Computer systems process information input by a user or received from the Internet.

At times, some or all of these functions may be integrated into a single system. For example, computer systems exist that may receive and display television signals. Computer systems also exist that allow telephone communication. Such integrated systems may be useful in a wide variety of environments. For example, a commodities trader may use an integrated computer system in order to make trading decisions based on real-time information and execute those trades in the shortest amount of time possible. Using the television interface of the integrated computer system, a commodities trader may view a 24-hour news channel in order to be informed of events that may affect the price of the commodity which he is trading. Using the integrated telephone system, the commodities trader might be able to engage in voice communications with others in order to convey or receive information pertinent to the commodity price. Using various application software on the computer, a commodities trader may perform calculations based on various scenarios (in many cases using information obtained from the other integrated functions) in order to estimate the effect of the price on the commodity being traded.

In many enterprises, individual computer users may customize their own computer systems. Thus, in scenarios such as the one above, different users may utilize different applications software or view different television channels in their respective integrated computer systems. Furthermore, some of these computer systems may not implement all of the functions. System administrators responsible for such a network may find it difficult to retain a consistent set of applications on each computer system of a network. Enterprises in which computer networks are implemented may find personnel making decisions from different sets of assumptions, which may further be detrimental to enterprise operations.

SUMMARY OF THE INVENTION

A system and method for providing a consistent work environment to a plurality of users is disclosed. In one embodiment, the system may include a plurality of computing systems which are located at a common location and connected by a network. Each of a plurality of human interfaces may be coupled to one of the plurality of computing systems by a communications link. Each human interface is located at a user location. Each user location may be remote from the common location where the plurality of computing systems are located. Each of the human interfaces may be operable to present to a user a graphical user interface for application software, a graphical user interface for conducting telephone calls with external parties, and a video window for displaying television programming.

In one embodiment, each of the human interfaces presents a consistent graphical user interface to its respective user. A method for providing the consistent work environment includes storing a common set of applications on the plurality of computing systems, presenting a common graphical user interface to the each of the plurality of user interfaces, executing a common set of software applications software on the computing system, and presenting a common set of information to each of a plurality of users at the human interfaces.

In one embodiment, each of the plurality of computing systems may have a card or blade form factor. Each computing system on a card may be housed in a cage, where the cage may support network communication between the computing systems. The system may include a communications link between each computing system cared and a respective human interface. Some or all of the human interfaces may be remote from the cage in which the computing systems are housed. The communications link may be either a serial or a parallel link, and may employ one or more of several different communications protocols (e.g. PCI, USB, etc.). The computing systems may be interconnected to form a network of computers.

BRIEF DESCRIPTION OF THE DRAWINGS

Other aspects of the invention will become apparent upon reading the following detailed description and upon reference to the accompanying drawings in which.

Figure 1A:
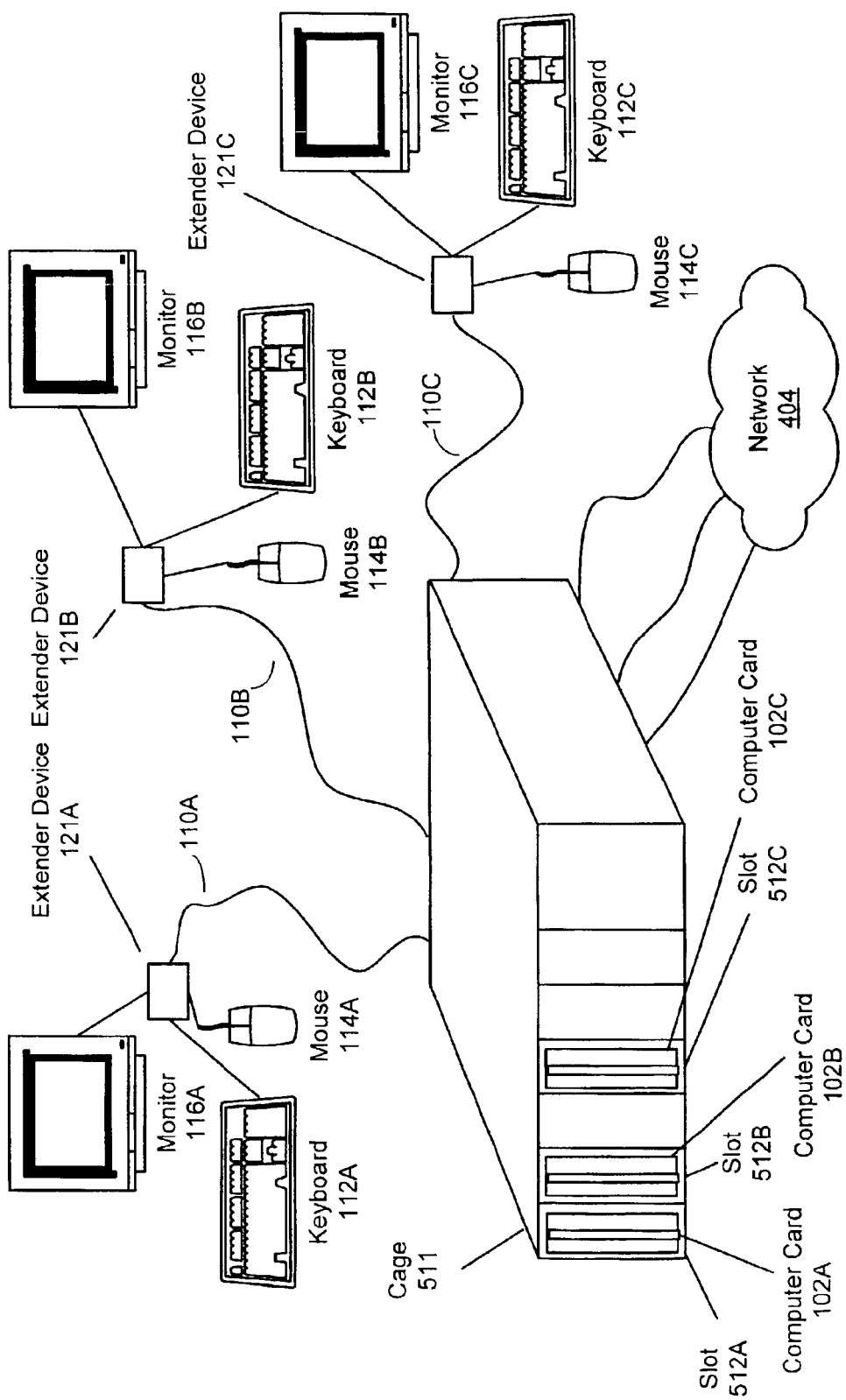
FIG. 1A illustrates a plurality of co-located computing systems coupled to corresponding remote human interfaces through PCI extender devices, according to one embodiment.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Incorporation by Reference

U.S. Provisional Patent No. 60/144,809 titled "A Technique To Extend The Operating Distance Of A Universal Serial Bus" is hereby incorporated by reference in its entirety as though fully and completely set forth herein.

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,037,884 titled "Technique To Encode Multiple Digital Data Streams In Limited Bandwidth For Transmission In A Single Medium", which was filed Oct. 27, 1997, whose inventor is Barry Thornton, is hereby incorporated by reference in its entirety as though fully and completely set forth herein.

U.S. Pat. No. 6,020,839 titled "Analog Technique To Detect Asymmetric Radio Frequency Pulses", which was filed Oct. 27, 1997, whose inventor is Barry Thornton, is hereby incorporated by reference in its entirety as though fully and completely set forth herein.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely, is hereby incorporated by reference in its entirety as though fully and completely set forth herein.

U.S. Pat. No. 5,994,952 titled "Narrow Band-Pass Interferometric Filter Having Enhanced Operational Characteristics", which was filed Oct. 22, 1997, whose inventor is Barry Thornton, is hereby incorporated by reference in its entirety as though fully and completely set forth herein.

U.S. Pat. No. 5,966,056 titled "Method And Apparatus For Enabling The Transmission Of Multiple Wide Bandwidth Electrical Signals", which was filed Jul. 3, 1996, whose inventor is Barry Thornton, is hereby incorporated by reference in its entirety as though fully and completely set forth herein.

U.S. Pat. No. 5,926,172, titled "Video Data Transmission And Display System And Associated Methods For Encoding/Decoding Synchronization Information And Video Data", which was filed Sep. 23, 1997, whose inventor is Williams Hanley, is hereby incorporated by reference in its entirety as though fully and completely set forth herein.

U.S. patent application Ser. No. 09/179,809 titled "A Technique To Transfer Multiple Data Streams Over A Wire Or Wireless Medium" is hereby incorporated by reference in its entirety as though fully and completely set forth herein.

U.S. patent application Ser. No. 09/619,989 titled "System And Method For Providing A Remote Universal Serial Bus", which was filed Jul. 20, 2000, whose inventors are Dan Barrett, Mike Barron, and Andrew Heller, is hereby incorporated by reference in its entirety as though fully and completely set forth herein.

U.S. patent application Ser. No. 09/680,760 titled "System And Method For Combining Computer Video And Remote Universal Serial Bus In An Extended Cable", which was filed Oct. 6, 2000, whose inventor is Barry Thornton, is hereby incorporated by reference in its entirety as though fully and completely set forth herein.

U.S. patent application Ser. No. 09/892,324 titled "Computer System Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though fully and completely set forth herein.

U.S. patent application Ser. No. 09/892,331 titled "System Comprising Multiple Co-Located Computer Systems Each Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though fully and completely set forth herein.

U.S. Pat. No. 4,885,718 titled "Extended Communications Link For Keyboard And Display Units Remotely Located From A Computer", which was filed Sep. 11, 1987, whose inventors are Robert R. Asprey and Remigius G. Shatas, is hereby incorporated by reference in its entirety as though fully and completely set forth herein.

U.S. Pat. No. 5,257,390 titled "Extended Range Computer Communications Link", which was filed Oct. 26, 1993, whose inventor is Robert R. Asprey, is hereby incorporated by reference in its entirety as though fully and completely set forth herein.

U.S. Pat. No. 5,268,676 titled "Computer Monitor Extended Range Communications Link", which was filed Dec. 7, 1993, whose inventors are Robert R. Asprey and Remigius G. Shatas, is hereby incorporated by reference in its entirety as though fully and completely set forth herein.

U.S. Pat. No. 6,185,643 titled "Method and Apparatus For Extending The Range Between A Computer And Computer Peripherals", which was filed Feb. 6, 2001, whose inventors are Philip M. Kirshtein and Robert R. Asprey, is hereby incorporated by reference in its entirety as though fully and completely set forth herein.

U.S. patent application Ser. No. 10/032,325 titled "System And Method For Remote Monitoring And Operation Of Personal Computers", which was filed Dec. 31, 2001, whose inventors are Ronald J. Perholtz and Eric J. Elmquest, is hereby incorporated by reference in its entirety as though fully and completely set forth herein.

Figure 1B:
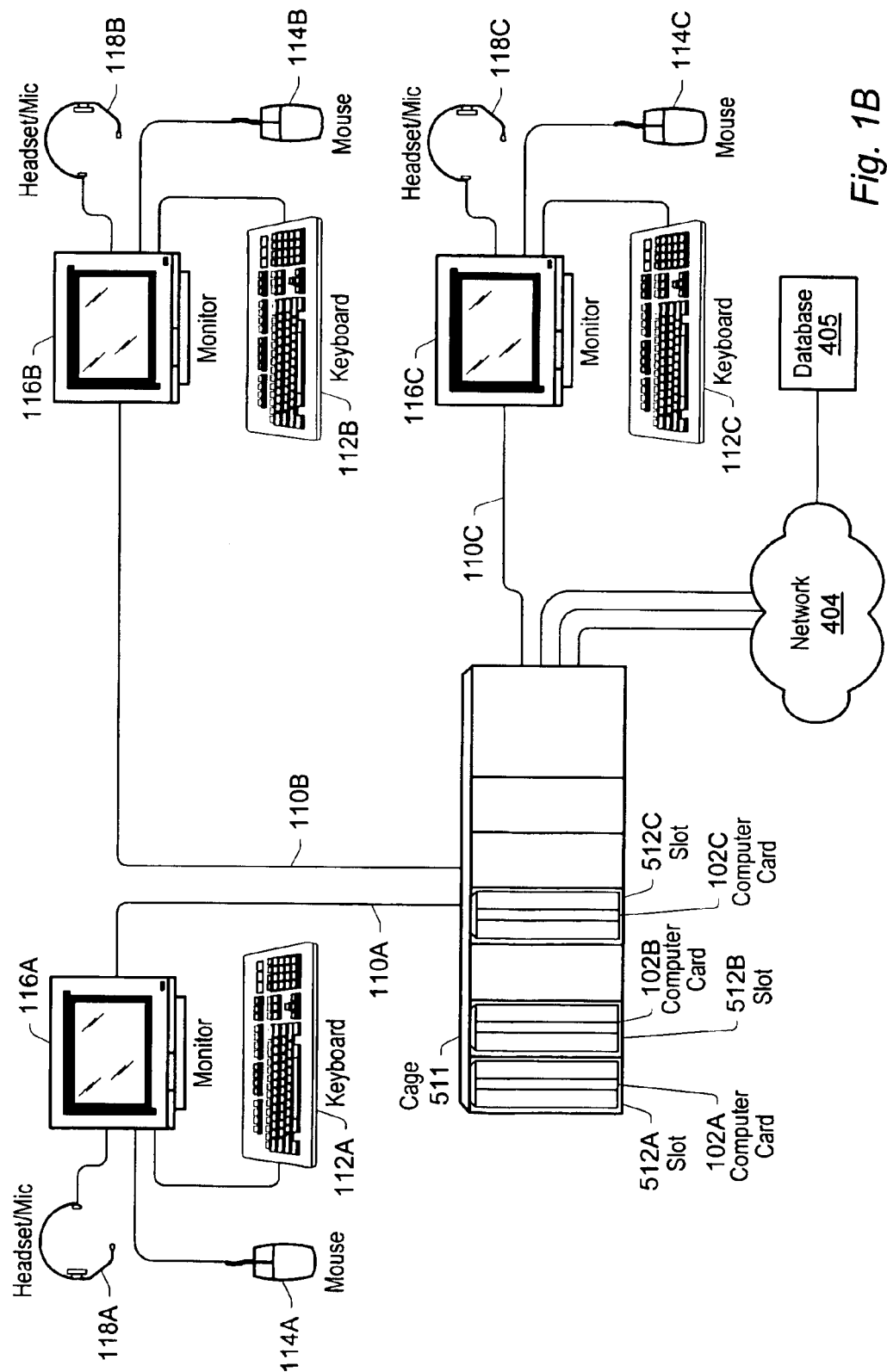
FIG. 1B illustrates the system of FIG. 4A, where each PCI extender device is included in a corresponding monitor, according to one embodiment.

FIGS. 1A–1B—Co-located Computing Systems with Remote Human Interfaces

FIGS. 1A and 1B illustrate embodiments of the invention where a plurality of computer cards 102A–102C may be installed in respective slots of cage 511, and where each computer card may be coupled via a transmission medium to a respective human interface, i.e., one or more human interface devices.

Figure 2A:
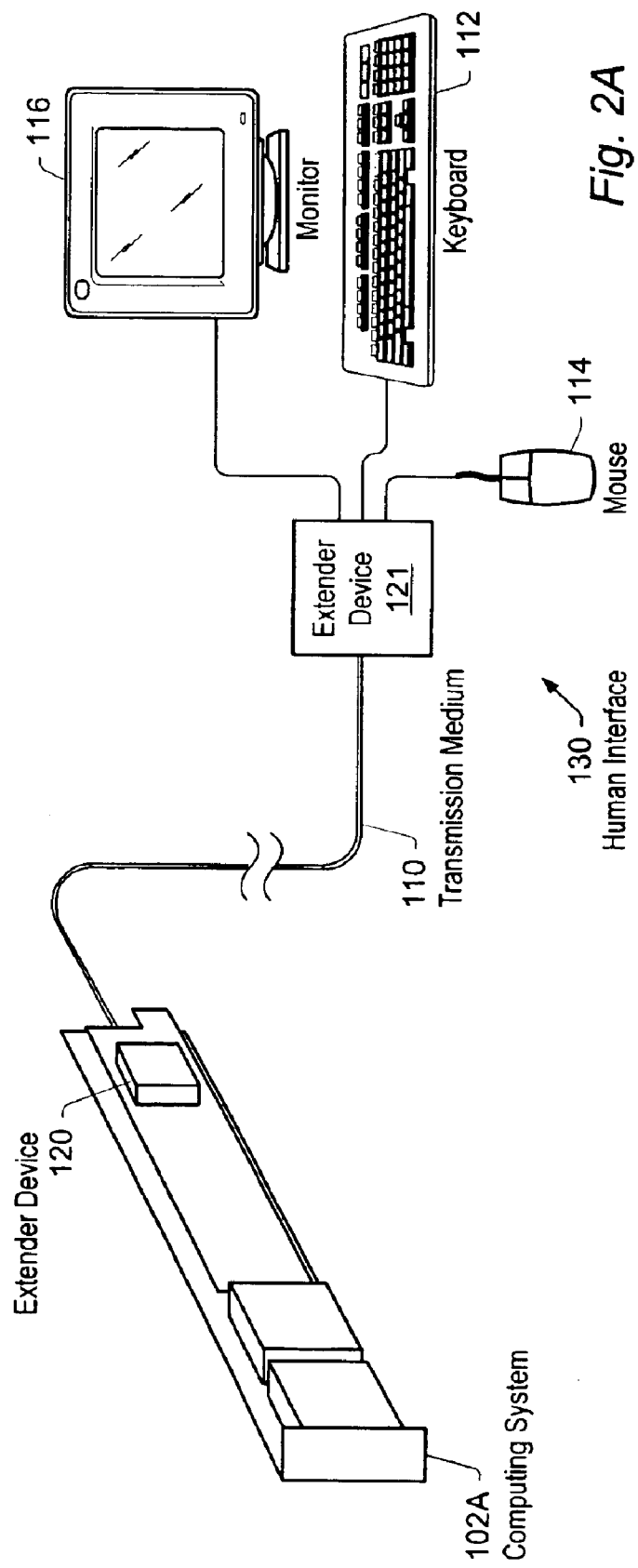
FIG. 2A illustrates a computer system using first and second extenders to communicate between a computing system on a card and a remote human interface, according to one embodiment.
Figure 2B:
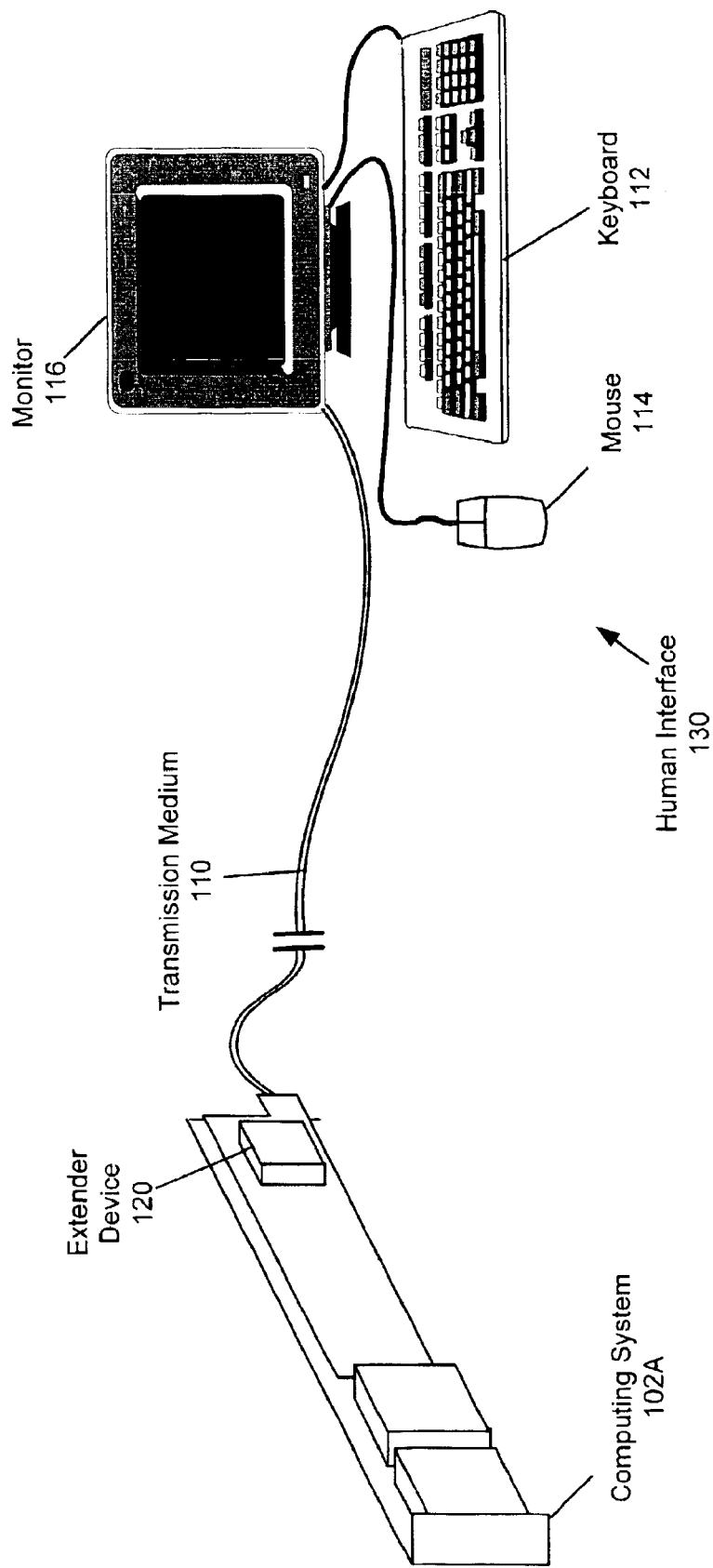
FIG. 2B illustrates a computer system where an extender device is included in a display device to communicate between a computing system on a card and a remote human interface, according to one embodiment.
Figure 3:
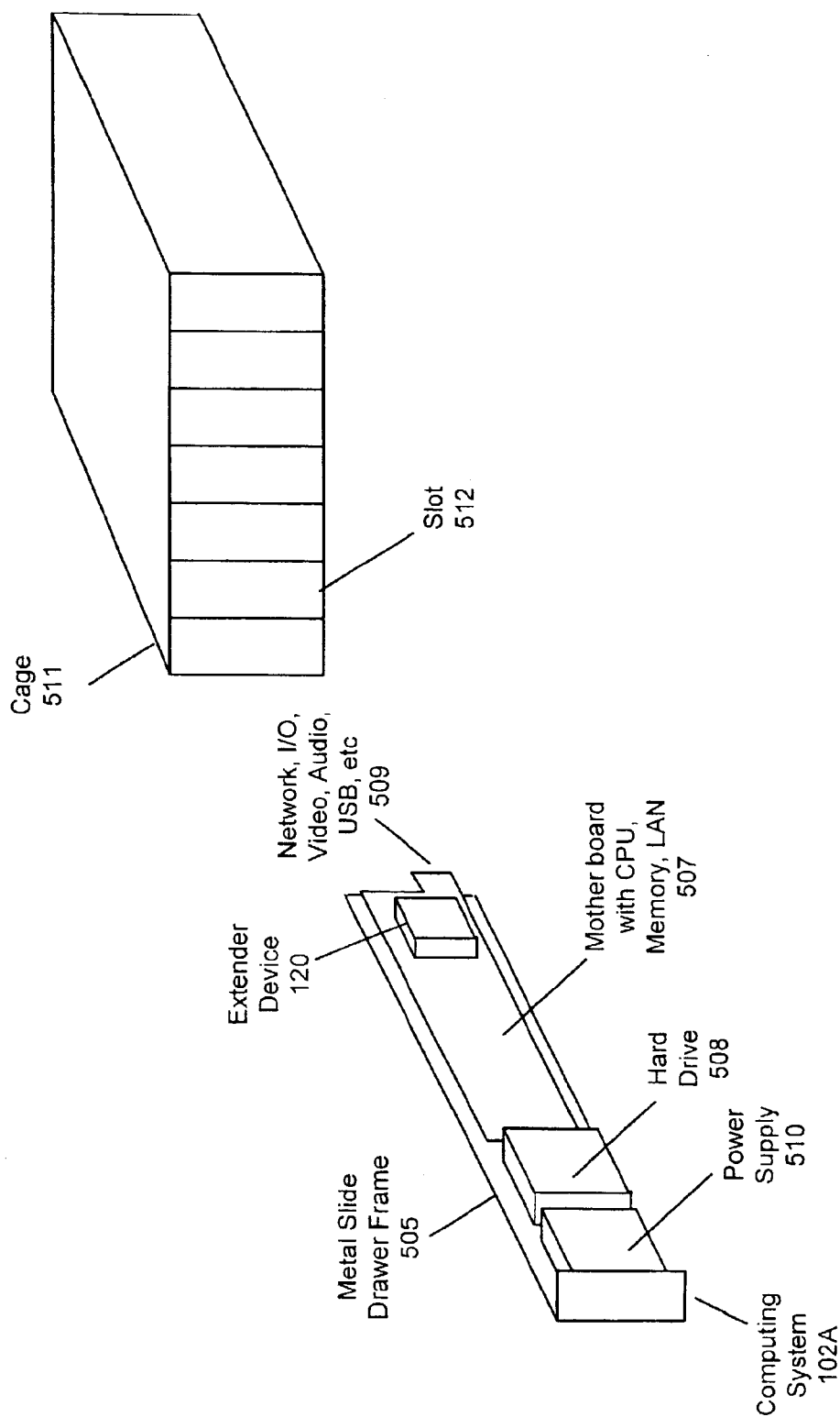
FIG. 3 illustrates a computer on a card and a cage for co-locating a plurality of such computers, according to one embodiment.

As shown in FIG. 1A, a computer card 102A may be inserted into cage slot 512A, and may thereby be coupled to keyboard 112A, mouse 112A, and monitor 116A, which comprise the human interface for that computer card (a more detailed view of one embodiment of a computer card may be found in FIGS. 2A, 2B and 3). Computer cards 102B and 102C may be similarly inserted into respective slots 512B and 512C and coupled to respective human interfaces as shown. Thus, the computer cards 102A–102C may all be installed in the cage 511 at a central location, while the user interface for each computer card may be located remotely from the cage 511, such as at the respective work areas of the users of the computer cards. It should be noted that the human interface devices shown here are for illustration purposes only, and that the actual type and number of devices comprised in each human interface may vary.

As FIG. 1A also shows, in one embodiment, the one or more human interface devices which compose each human interface 130 may be coupled to a transmission medium through an extender device 121, such as a PCI extender device. For example, the human interface associated with computer card 102A may be coupled to the transmission medium through the extender device 121A, as shown. In other words, the monitor 116A, the keyboard 112A, and the mouse 112A (and any other human interface device comprised in the human interface for computer card 102A) may plug in to the extender device 121A. Similarly, as FIG. 1A shows, the human interface devices corresponding to computer cards 102B and 102C may be coupled to their respective transmission mediums (110A, 110B, 110C) through respective extender devices 121B and 121C.

In addition to the extender devices 121 shown in the drawing, each of computer cards 102A, 102B, and 102C may also include a corresponding extender device (as will be shown in FIGS. 2A, 2B and 3). The extender devices on computer cards 102A, 102B and 102C may correspond with their respective extender devices 121A, 121B, and 121C in the human interfaces, as shown. The extender device of each computer card may be coupled to the extender device of its corresponding human interface via the respective transmission medium. Each of transmission mediums 10A, 10B, and 10C may be a serial bus in one embodiment, although other embodiments are possible and contemplated.

Each computing system in cage 511 may be coupled to (and thus a part of) network 404. Additional computing systems may be coupled to network 404 by linking together multiple instances of cage 511 (with computing systems installed). Network 404 may conform to one of many commonly available commercial network protocols (e.g. Ethernet). Thus, users of each of the computing systems coupled to network 404 may be able to communicate with one another by e-mail, network file sharing, and so forth. Network 404 may also allow Internet access to be provided to each user of a computing system to which the network is coupled. Network 404 may also link each computing system coupled to the network to database 405, which may allow a consistent set of data to be provided to each of the human interfaces. Multiple instances of database 405 may be present in various embodiments.

It should be noted that protocols other than PCI may be used with the extender devices discussed herein (e.g. USB, universal serial bus). It should also be noted that extenders are possible and contemplated wherein multiple protocols are used in order to enhance both the functionality of each computing system and communication with its respective human interface.

FIG. 1B illustrates a computer system similar to that described with reference to FIG. 4A, but where the components of each extender device 121 are comprised in the monitor 116 of each respective human interface 130. It should be noted the inclusion of the extender device 121 in the monitor 116 is meant to be an illustrative embodiment and is not intended to limit the invention thus. In other words, any of the human interface devices may be adapted to include the extender device 121 through which the other human interface devices may couple to the respective transmission medium 110.

Also shown in FIG. 1B is a headset/microphone 118 (118A, 118B, 118C) coupled to each of the monitors (and thus the extender device). These headset/microphones 118 may also be implemented in other embodiments including the embodiment of FIG. 1A. Headset/microphones 118 may be used with telephone circuitry (which will be discussed below) in order to enable each human interface to implement telephone functionality. Each headset/microphone 118 includes at least one earpiece/headphone to enable a user to listen to incoming audio signals, and a microphone used to generate audio signals from words spoken by the user.

The computing systems illustrated above in FIGS. 1A and 1B may be operable such that each of their respective human interfaces presents a common set of functions. In one embodiment, the common set of functions may include a graphical user interface for application software executing on the computing system corresponding to each human interface, a graphical user interface for conducting telephone calls, and a video winder for displaying television programming.

The graphical user interface presented may be consistent across all of the human interfaces (i.e. each of them are the same). This may include the presenting a common software application or common set of software applications by a user of each computing system. Examples of such software applications may include word processors, spreadsheets, database applications, Internet web browsers, and so on. Since the computing systems are commonly located, a system administrator may configure the software applications for each system so that they maintain consistency in both appearance and functionality from one human interface to another.

A telephone interface may also be presented on each human interface. Telephone interface circuitry (discussed below) present in each human interface may allow for a user of a computing system to conduct telephone communications with external parties. The telephone functionality may be facilitated by the presence of headset/microphones 118A shown in FIG. 1B (but may also be present with other embodiments). Some embodiments may also be configured to employ various types of traditional telephone handsets.

Through the use of video and audio circuitry that may be present in each of the computing systems in cage 511, television programming may be presented to each of the human interfaces. In one embodiment, each monitor associated with a computing system may be operable to display a video window through which the television programming is received. In order to maintain consistency across the network, some embodiments may allow a system/network administrator to configured the plurality of computing systems connected by a network to display the same channel. In such embodiments, it may be possible for each user of the network to simultaneously receive the same audio and video signals associated with the television programming. Thus, across an enterprise-wide computing network, all users may receive the same information from the television programming. In general, the plurality of computing system may be configured such that each user receives substantially the same information at his/her respective human interface.

FIGS. 2A–2B—Computer System with Remote Human Interface

FIGS. 2A–2B illustrate various embodiments of a computer system where a computing system at one location is coupled through a transmission medium to a human interface at a second location, and where the second location is remotely located with respect to the first location. These embodiments are exemplary, and various other embodiments of the invention may be employed.

In a conventionally configured computer system, the monitor, the keyboard, the mouse and the printer would be provided with a respective cable which terminates in pin connectors which, when inserted into a matching plug connector provided on a rear side surface (or "backplane") of the computing system, couples the monitor, the keyboard, the mouse and the printer to the main system bus (not shown) which couples the various electronic devices (including, but not limited to the motherboard, the disk drive and the hard drive) which comprises the computing system. Unlike the conventionally configured computer system, however, the monitor 116, the keyboard 112, the mouse 114 and the printer are remotely located relative to the computing system 102A. To enjoy the benefits of a remotely located human interface 130 as described herein, it is generally contemplated that the computing system 102A and the human interface 130 be located in separate rooms, which typically requires a minimum separation of at least 10 feet. It is specifically contemplated, however, that the computing system 102A and the human interface 130 may be located hundreds, or even thousands, of feet apart.

Thus, by the term "remotely located", it is intended to refer to separation distances greater than those possible using conventionally designed cables such as those provided when purchasing a PC. Accordingly, the term "remotely located", as used herein, generally refers to separation distances between 10 and 1,000 feet. However, as it is possible to utilize the disclosed techniques to separate the computing system 102A and the human interface 130 by distances greater than 1,000 feet, it should be clearly understood that the aforementioned upper limit of 1,000 feet is given by way of example and should not be construed as a limitation on the scope of the present invention.

To achieve the separation distances contemplated herein, an upstream extension interface is coupled to the computing system 102A and a downstream extension interface is coupled to the human interface 130. Generally, connector cables extending from the monitor 116, the keyboard 112, the mouse 114 and the printer all plug into the downstream extension interface in an manner identical to how those same cables would plug into the backplane of the computing system. Similarly, the cables extending from the upstream extension interface identically plug into the backplane of the computing system as would the cables from the monitor, the keyboard, the mouse and the printer plug thereinto. Finally, coupling the upstream extension interface and the downstream extension interface is a 4-wire cable configured in the manner disclosed in co-pending U.S. Pat. No. 5,966,056 filed Jul. 3, 1996 entitled "Method and Apparatus for Enabling the Transmission of Multiple Wide Band Width Electrical Signals, assigned to the Assignee of the present application and hereby incorporated by reference as if reproduced in its entirety.

As used herein, the terms "first" and "second" are each used to refer to a location of a device at either the computing system location or at the human interface location. Thus a "first" device may be either at the computing system side or the human interface side, and similarly a "second" device may be either at the computing system side or the human interface side.

FIG. 2A—A Computing System on a Card with Remote Human Interface

FIG. 2A illustrates one embodiment of a computing system 102A coupled to remote human interface 130 through the transmission medium 110 (e.g. a serial bus or link). As in the system described with reference to FIG. 1A, the one or more human interface devices may be coupled to the transmission medium 110 via extender devices 120/121 (e.g. PCI extender devices) which may be operable to extend the functional distance between the computing system 102A and the human interface 130, i.e., the one or more human interface devices. Further details of the extender devices 120/121 are provided below.

As FIG. 2A shows, in one embodiment, the computing system 102A may be a "computer on a card" or "blade", i.e., the computing system 102A may be comprised on a circuit card which may include standard computing system components such as a CPU, memory, and power supply. In one embodiment, the computing system 102A may further include an extender device 120 (e.g., a PCI extender device) which may couple to the transmission 110 and which may operate in conjunction with an extender device 121 at the remote location (the location of the remote human interface 130) to extend the functional distance between the computing system 102A and the human interface 130, as mentioned above.

FIG. 2B—Another Computing System on a Card with Remote Human Interface

FIG. 2B illustrates the computing system 102A (having an extender device 120) of FIG. 2A with an embodiment of the remote human interface in which the extender device 121 is included in the display device or monitor 116. In this embodiment, the other human interface devices included in the human interface 130, e.g., the keyboard 112 and mouse 114, may be coupled to the transmission medium 110 through the monitor 116, i.e., the extender device 121 inside the monitor 116. Thus, the monitor 116 may function as a human interface 'hub' for other human interface devices. It should be noted that although in this embodiment the monitor 116 includes the extender device 121, it is contemplated that the extender device 121 may be included in any of the human interface devices. For example, in one embodiment, the extender device 121 may be included in the keyboard 112. In this case, the other human interface devices, e.g., the monitor 116 and mouse 114 (and/or any other human interface devices), may plug into the keyboard (i.e., the extender device 121 located in the keyboard). Other human interface devices which may be adapted to include the extender device 121 include a pointing device (e.g., a mouse, trackball, joystick, etc.), a printer, a telephone, a biometric sensor, a barcode reader, a VR interface device, and a PDA IR device, among others. Thus, in various embodiments of the invention, any of the human interface devices may be adapted to include the extender device 121, and thus function as a human interface hub for other human interface devices.

FIG. 3—A Computing System on a Card

FIG. 3 illustrates the computing system of FIGS. 1A and 1B, according to one embodiment. As FIG. 3 shows, the computing system 102A may include a motherboard 507 with CPU, memory, and networking logic, as well as a power supply 510, and possibly a hard drive 508. Thus, the computing system 102A may comprise a "computer on a card", also referred to as a "computer card" or "blade". As mentioned above, the computing system 102A may further include an extender device 120 which may operate to extend the operational distance for a human interface located remotely from the computing system 102A. A connector 509 may enable the transfer of various signals between computing system 102A and a human interface. Such signals may include (but are not limited to) network signals, video signals, audio signals, various peripheral bus signals (e.g. universal serial bus), and so forth.

In one embodiment the computing system 102A may include a cabinet, referred to as a cage 511, having a plurality of slots 512. The computer card may be adapted to be inserted into one of the slots of the cage. The computer card 102A may be operable to slide into a slot 512 of the cage 511, thereby making contact with a cage connector which may couple to the transmission medium 110. Thus, the computer card may comprise a complete PC on a single slide drawer frame which may be only 3 rack units high (5.25 inches), and thus may occupy a much smaller space than standard PC units. The cage 511 may be operable to receive a plurality of such computer cards via the plurality of slots 512, thus providing a means for co-locating a plurality of computing systems, each having a remote human interface, as described above. The cage may include a backplane or communication medium connecting each of the cage connectors, thereby enabling networking of the computer cards, such as an Ethernet network. Further details of the computer card may be found in U.S. patent application Ser. No. 09/728,667 titled "Computer on a Card with a Remote Human Interface", and U.S. patent application Ser. No. 09/728,669 titled "A System of Co-Located Computers in a Framework Including Removable Function Modules for Adding Modular Functionality" which are both incorporated by reference above.

Figure 4:
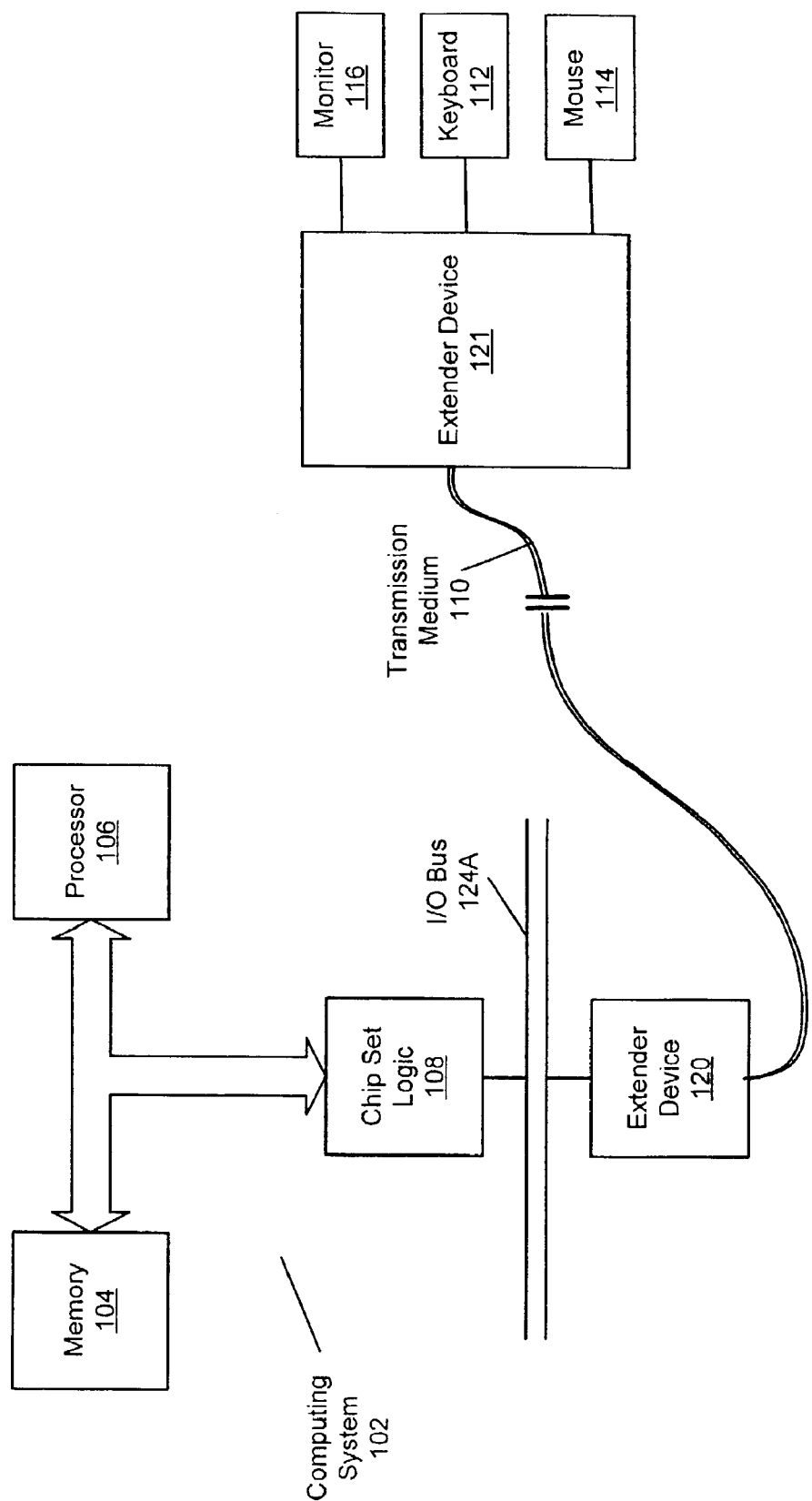
FIG. 4 is a block diagram illustrating one embodiment of computer system using first and second extenders to communicate between a computing system on a cared and a remote human interface.

FIG. 4—Block Diagram of a Computing System with Remote Human Interface

FIG. 4 is a block diagram of a computer system such as those described above in FIGS. 1A and 1B. It should also be noted that the block diagram presented herein may be applicable to any one of the computer system embodiments incorporated by reference as noted above.

As FIG. 4 shows, the computing system 102, at a first location, may be coupled through a transmission medium, such as serial bus 110, to one or more human interface devices of a remote human interface 130, such as keyboard 112, mouse 114, and monitor 116, located at a second location.

In one embodiment, the computing system 102 may include a CPU or processor 106, a memory medium 104 coupled to the CPU 106, and a first I/O bus 124A coupled to the CPU 106, for example, through chip set logic 108. The computing system 102 may also include a first extender device 120 coupled to the first I/O bus 124A, as indicated. In one embodiment, the first I/O bus 124A may be a PCI bus, and the first extender device 120 may be a PCI extender device 120. Embodiments using other peripheral bus architectures/protocols are possible and contemplated. In an embodiment in which the computing system 102 is a computer card 102A (i.e., a circuit card), as described above with reference to FIG. 3, the first extender device 120 and the first I/O bus 124 may be comprised on the circuit card.

As FIG. 4 also shows, in one embodiment, the computer system may also include a second extender device 121 coupled to the one or more human interface devices, where the second extender device 121 may be remotely located relative to the first location, i.e., remotely located relative to the computing system 102.

Thus, in one embodiment, the transmission medium 110 may couple the first and second extender devices 120 and 121 which are comprised respectively in the computing system 102 and the remote human interface, where the one or more human interface devices are useable by a user to interface remotely with the computing system.

It should be noted that in various embodiments, the one or more human interface devices operate as if they were located in the first location and directly connected by human interface cables to the computing system. In other words, the extension of the human interface may be transparent to the user.

Figure 5:
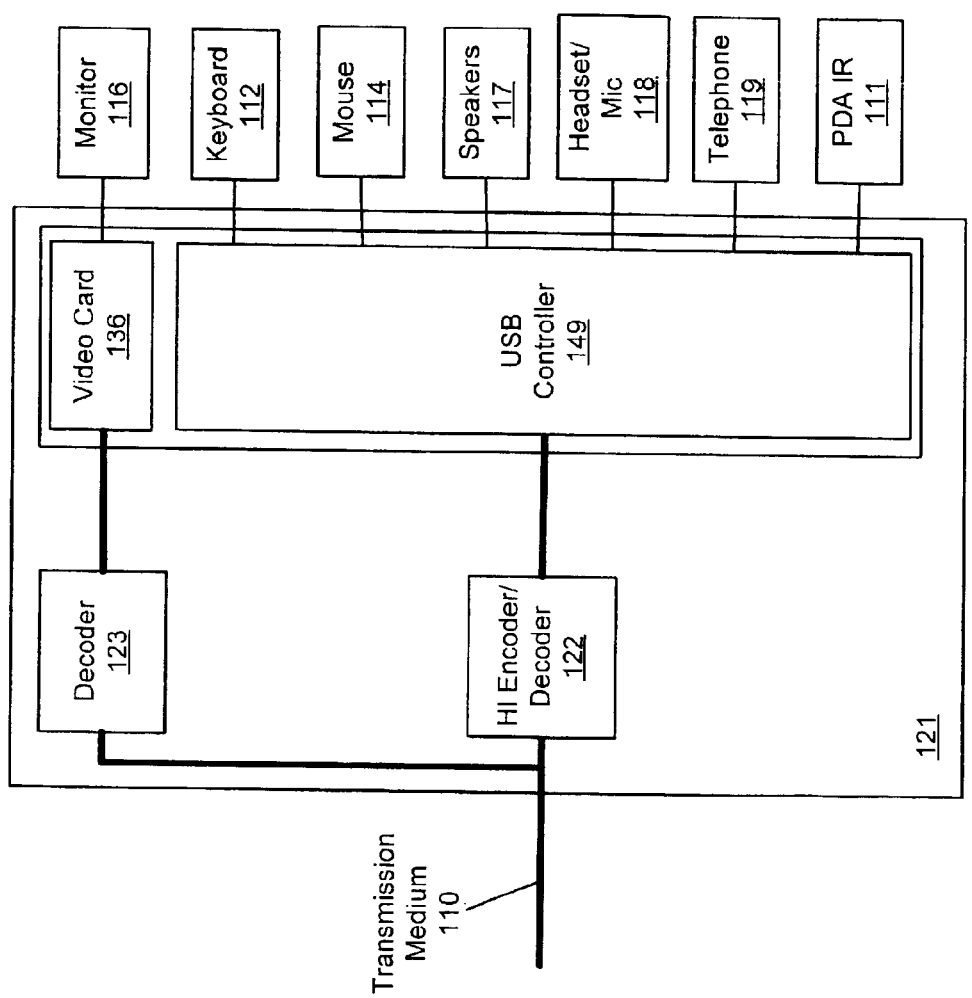
FIG. 5 is block diagram of one embodiment of a remote human interface with an extender device.

FIG. 5—Remote Human Interfaces with Extender

FIG. 5 is a block diagram of one a remote human interface coupled to multiple human interface devices. In the embodiment shown, extender device 121 is coupled to transmission medium 110, which may be coupled to a computing system as shown in one of the previous figures. Transmission medium 110 may be coupled to both human interface (HI) decoder/encoder 122 and decoder 123. The human interface devices in this particular example include monitor 116, keyboard 112, and mouse 114, as well as speakers 117, headset/microphone 118, telephone 119, and an interface for a personal digital assistant, PDA IR 111 (personal digital assistant infrared). It should be noted that in other embodiments, other human interface devices not shown, such as biometric sensors, storage devices (e.g. floppy disk drives) and barcode scanners may be coupled to extender device 121.

In this particular embodiment, extender device 121 includes a video card 136 to which monitor 116 is coupled and a universal serial bus (USB) controller 149 to which the remainder of the peripheral devices is coupled. USB controller may be coupled to HI decoder/encoder 122. Incoming signals on a computing system via transmission medium 110 (which may be a serial link in this and other embodiments) may be decoded by HI encoder/decoder before being forwarded to USB controller 149 and eventually their intended destination. Signals generated by one of the human interface devices (e.g. keyboard or mouse) are received by USB controller 149 and forwarded to HI encoder/decoder, which encodes the signals for transmission to the computing system via transmission medium 110.

Video signals received over transmission medium 110 may be decoded by decoder 123 and forwarded to video card 136, which may then convert the decoded video signals into a display on monitor 116.

Since signals having multiple sources and multiple destinations may be conveyed over transmission medium 110, HI encoder/decoder 122, USB controller 149, or both may include both multiplexer and de-multiplexer circuitry. Signals received from a computing system via transmission medium 110 may be demultiplexed in HI encoder/decoder in order to route them to their intended device. Signals generated by the human interface devices may be multiplexed in order for transmission to a computing system on transmission medium 110. Decoder 123 may also include a demultiplexer 123 for separating video signals from other incoming signals. Various embodiments may employ time division multiplexing, frequency division multiplexing, or other techniques that may be appropriate when multiple signals must be conveyed over a single transmission medium.

While the example shown here uses employs USB controller 149 to couple extender device 121 to various human interface devices, other types of interfaces may be utilized as well. For example, a PCI (peripheral component interconnect) bus may be implemented within extender 121 and may include a bus controller or bridge which may enable the coupling of various human interface devices. It should also be noted that transmission medium 110 may include serial and/or parallel communications paths between extender 121 and its respective computing system.

Figure 6:
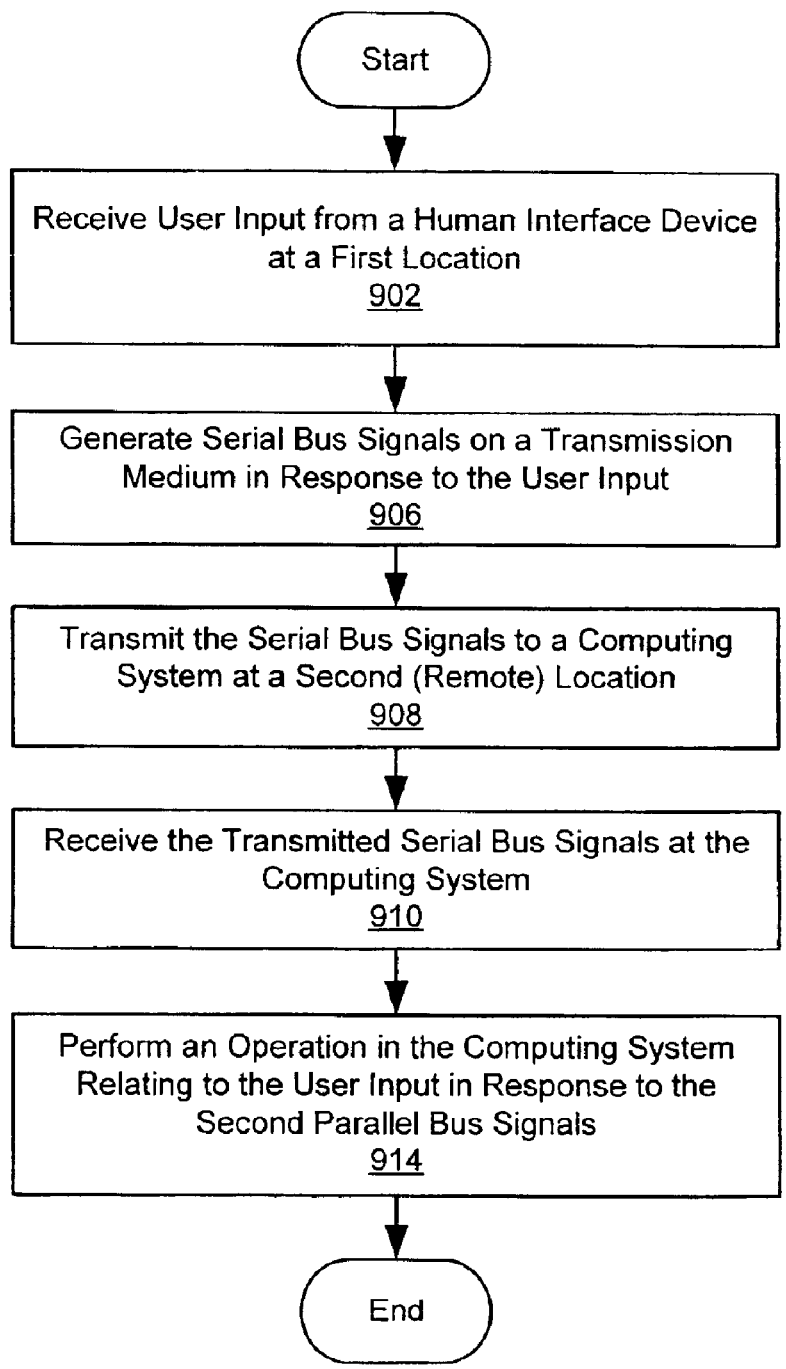
FIG. 6 flowcharts a method for sending user input from a remote human interface device to a computing system, according to one embodiment.

FIG. 6—Flowchart of a Method for Operating a Computer System

Figure 7:
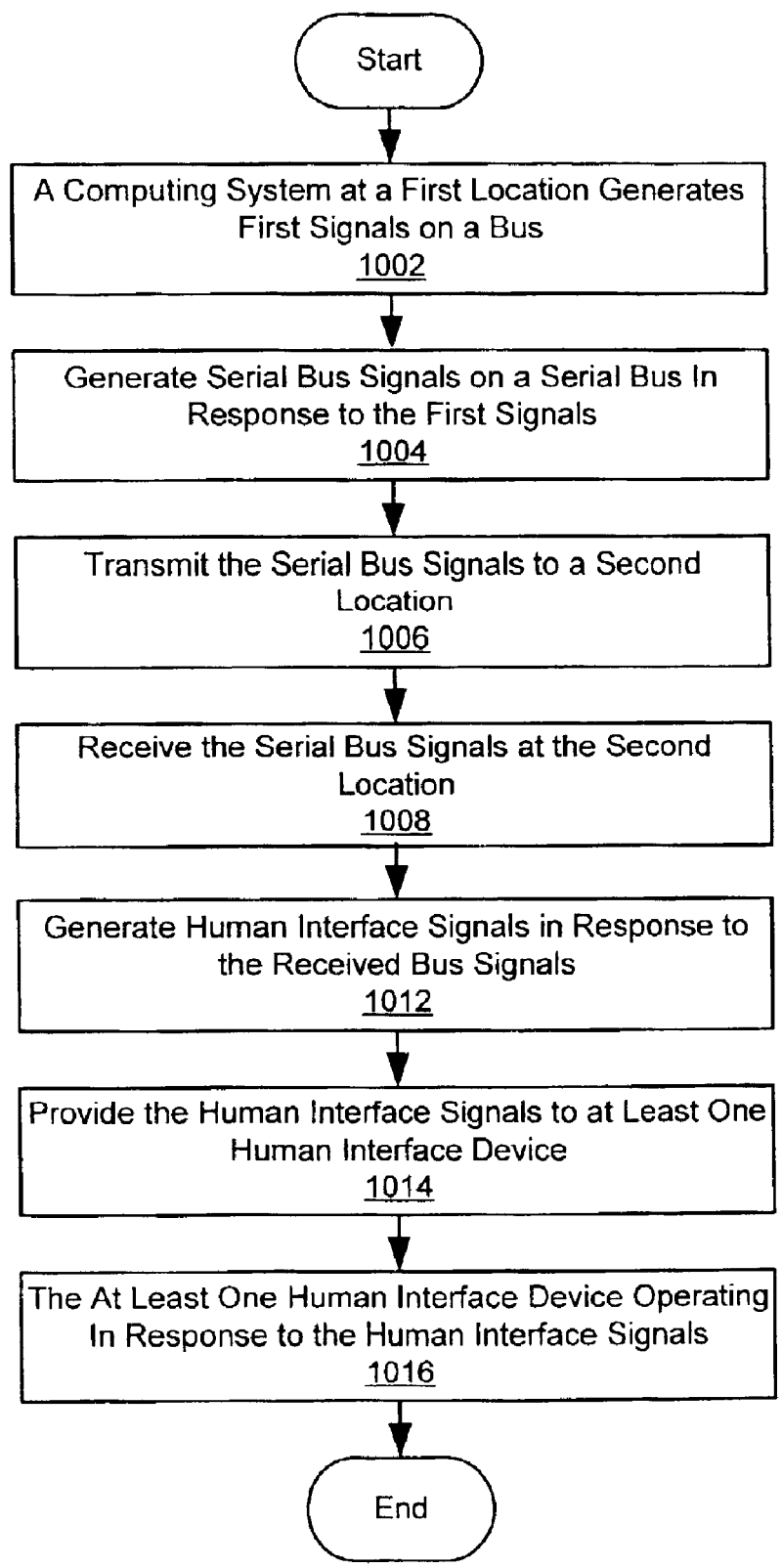
FIG. 7 flowcharts a method for sending user interface signals from a computing system to a remote human interface device, according to one embodiment.

FIG. 6 flowcharts one embodiment of a method for operating a computer system, such as the computer systems described above, where the computer system comprises a computing system and one or more human interface devices, where the one or more human interface devices are located remotely from the computing system. For example, in one embodiment, the one or more human interface devices may be located more than 10 feet from the computing system. In another embodiment, the one or more human interface devices may be located more than 20 feet from the computing system. It should be noted that in various embodiments one or more of the following steps may be performed in a different order than shown, or may be omitted entirely. Other additional steps may also be performed as desired. The method presented below with reference to FIG. 6 describes communication flow from a human interface device at a remote human interface to a computing system. FIG. 7, described subsequently, flowcharts the communication flow from the computing system to the human interface device. In other words, the two methods describe complementary data flows through a common system.

As FIG. 6 shows, in 902 user input may be received from a human interface device located in a first location. As mentioned above, the human interface device may be one of a monitor, a keyboard, a mouse, audio speakers (or headphones), a microphone, a printer, a scanner, a telephone, a removable storage medium (e.g., an optical drive, a floppy drive, a tape drive, or a hard disc drive), a biometric sensor (e.g., for access control), a barcode reader, a VR interface device, and a PDA IR device, among others. It is noted that in one embodiment, each of the human interface devices may have corresponding human interface circuitry, or device interface circuitry, as described above, for communicating human interface device signals with the human interface device. For example, where the one or more human interface devices comprise a display monitor, the human interface circuitry may include video display circuitry for providing video signals to the display monitor. Where the one or more human interface devices comprise a keyboard, the human interface circuitry may include keyboard circuitry for communicating keyboard signals with the keyboard. Thus, in one embodiment, the user input from the human interface device may be received by the device interface circuitry.

In 906, transmission signals may be generated on a transmission medium in response to input from a human interface device. The human interface device signals may be formatted in such a way to allow their transmission across the transmission medium to their respective computing system. In 908, the transmission signals may be transmitted to a computing system located at a second location which is located remotely from the first location. In one embodiment, the computer system may comprise a first extender, located in the first location, and the generation of the transmission signals and the transmittal of the transmission signals to the computing system may be performed by the first extender.

Additionally, in one embodiment, the transmission medium coupling the first and second extenders may be a 4-wire cable. In another embodiment, the transmission medium may be a serial bus coupled between the first extender and the second extender, where the serial bus includes first and second ends, and where the first end of the serial bus is coupled to the first extender and the second end of the serial bus is coupled to the second extender. Thus, the transmission signals may be serial bus signals. In one embodiment, the transmission signals generated on the transmission medium may be high speed serial bus signals generated on a high speed serial bus. As mentioned above, although the transmission medium is preferably a serial bus, in some embodiments, the transmission medium may be a parallel bus. As also mentioned above, in various other embodiments, the transmission medium may be a wireless medium, an IEEE 1394 or IEEE 1394.2 bus, a fiber optic medium, a switched fabric bus, such as an Infiniband bus, or any other suitable transmission medium.

In 910, the computing system may receive the transmission signals from the transmission medium. Finally, in 914, the computing system may perform an operation in response to the second bus signals, where the operation is in response to the user input.

As mentioned above, in one embodiment, the first extender may include first I/O interface circuitry for interfacing to the human interface to the computing system, and the second extender may include interface circuitry for interfacing to the human interface to various human interface devices. In one embodiment, the first extender, the second extender, and the transmission medium may operate as a single bus bridge between the computing system and the human interface. In one embodiment, the first extender may operate as a first portion of the bus bridge, and the second extender may operate as a second portion of the bus bridge, and, in one embodiment, the first extender and the second extender may collectively implement an I/O bridge register set of the single bus bridge. For example, the first extender may implement a first fraction (e.g., a first half) of the bridge register set, and the second extender may implement a second fraction (e.g., a second half) of the bridge register set.

Thus, in one embodiment, the CPU in the computing system may be operable to generate cycles on the bus to communicate with the one or more human interface devices. In other words, the memory of the computer system may store software developed to communicate with a first human interface device that would be coupled to the bus of the computing system, and which may be executable to communicate with human interface devices coupled to either the bus or the extender (e.g. extender 121 shown in various figures discussed above).

As mentioned above, in one embodiment, the extenders may be operable to convert signals to and from transmission signals of the serial bus. For example, the first extender may be operable to receive first cycles on the bus and generate first serial data on the serial bus in response thereto. The second extender may be operable to receive the first serial data from the serial bus and generate cycles for one or more of the human interface devices. The second extender may be operable to receive third cycles on the bus and generate second serial data on the serial bus in response thereto, and the first extender may be operable to receive the second serial data from the serial bus and generate fourth cycles on the first bus. Said another way, in one embodiment, each of the first extender and the second extender may include parallel/serial transceivers for converting parallel data generated on the first parallel bus and second parallel bus, respectively, to serial data for transmission on the serial bus and for converting serial data received from the serial bus to parallel data for generation on the first parallel bus and second parallel bus, respectively.

To summarize one embodiment of the above method, user input may be received from a human interface device located in a first location. First parallel bus signals may be generated on a first parallel bus in response to the user input. Serial bus signals may then be generated on a serial bus in response to the first parallel bus signals. The serial bus signals may then be transmitted to a computing system located in a second location which is located remotely from the first location. The computing system may receive the serial bus signals from the serial bus. Second parallel bus signals may then be generated on a second parallel bus in the computing system in response to the received serial bus signals. Finally, the computing system may perform an operation in response to the second parallel bus signals, where the operation is in response to the user input.

FIG. 7—Flowchart of Another Method for Operating a Computer System

FIG. 7 flowcharts one embodiment of a method for operating a computer system, such as the computer systems described above, where the computer system comprises a computing system and one or more human interface devices located remotely from the computing system. It should be noted that in various embodiments one or more of the following steps may be performed in a different order than shown, or may be omitted entirely. Other additional steps may also be performed as desired.

As FIG. 7 shows, in 1002, a computing system may generate first bus signals on a bus, where the bus signals comprise data for communicating with a human interface device, where the computing system is located at a first location.

In 1004, transmission signals may be generated on a transmission medium in response to the bus signals, and, as indicated in 1006, the transmission signals may be transmitted to a second location located remotely from the first location. In one embodiment, the computer system may include a first extender, located in the first location, which may generate the transmission signals on the transmission medium in response to the first bus signals, and transmit the transmission signals to the second location.

In 1008, the transmission signals may be received at the second location. In one embodiment, the computer system may include a second extender which may receive the transmission signals from the transmission medium. In one embodiment, the signals may be received by an extender, which may include an interface controller (e.g. a USB controller) for interfacing to various human interface devices.

In 1012, human interface signals may be generated in response to the extender receiving the transmission signals. Then, in 1014, the human interface signals may be provided to at least one human interface device.

Finally, the at least one human interface device may operate in response to the human interface signals. As mentioned above, in various embodiments, the one or more human interface devices may include any of a variety of human interface devices, as described above.

To summarize one embodiment of the above method, a computing system may generate first signals on a bus, the first signals comprising data for communicating with a human interface device, where the computing system is located at a first location. Serial bus signals may be generated on a serial bus in response the first parallel bus signals. The serial bus signals may be transmitted to a second location located remotely from the first location. The serial bus signals may then be received at the second location, and human interface device signals may be generated in response to the received serial bus signals. The human interface signals may then be provided to at least one human interface device. Finally, the at least one human interface device may operate in response to the human interface signals.

Thus, by implementing the two methods described above, communications may be facilitated between a computing system and a remote human interface. According to one embodiment of the invention, the combined methods may be implemented in the following manner:

In one embodiment, the computing system 102 may be operable to generate first bus signals for communication with the one or more human interface devices. The first extender device 120 may be operable to receive and convert the first bus signals generated by the computing system 102 into first transmission signals suitable for transmission to the second extender device 121. The second extender device 121 may be operable to receive and convert the first transmission signals received from the first extender device 120 into signals that may be presented to the various human interface devices to which it is coupled. The human interface circuitry (e.g. USB controller 149 of FIG. 5) may be operable to receive the signals and generate human interface signals to the one or more human interface devices in response thereto.

The one or more human interface devices may be operable to generate human interface signals in response to user input, where the human interface signals are intended for the computing system. The human interface circuitry may be operable to receive the human interface signals and generate signals which may be received by extender device 1211. The second extender device 1211 may be operable to convert the signals into transmission signals suitable for transmission to the first extender device 120. The first extender device 120 may be operable to receive the transmission signals from the second extender device 121 and convert the second transmission signals into bus signals on a bus in computing system 102. The computing system may be operable to then receive the bus signals and perform operations based on the bus signals.

From a different perspective, the combined methods (described with reference to FIGS. 6 and 7) may be implemented in the following manner:

In one embodiment, the one or more human interface devices may be operable to generate human interface signals in response to user input, wherein the human interface signals are intended for the computing system. The second extender may be operable to convert the human interface device signals into first transmission signals suitable for transmission to the first extender. The first extender may be operable to receive and convert the first transmission signals received from the second extender into second bus signals on a bus in the computing system. The computing system may be operable to receive the second bus signals and perform operations based on the second bus signals.

The computing system may be operable to generate third bus signals onto its bus for communication with the one or more human interface devices. The first extender may be operable to receive and convert the third bus signals generated on the bus by the computing system into second transmission signals suitable for transmission to the second extender. The second extender may be operable to receive and convert the second transmission signals received from the first extender and generate human interface signals to the one or more human interface devices in response thereto.

Thus, by implementing the above methods, the one or more human interface devices may operate as if they were located in the first location and directly connected by human interface cables to the computing system. In other words, the extended distance between the computing system and the remote human interface may be transparent to the user.

Figure 8:
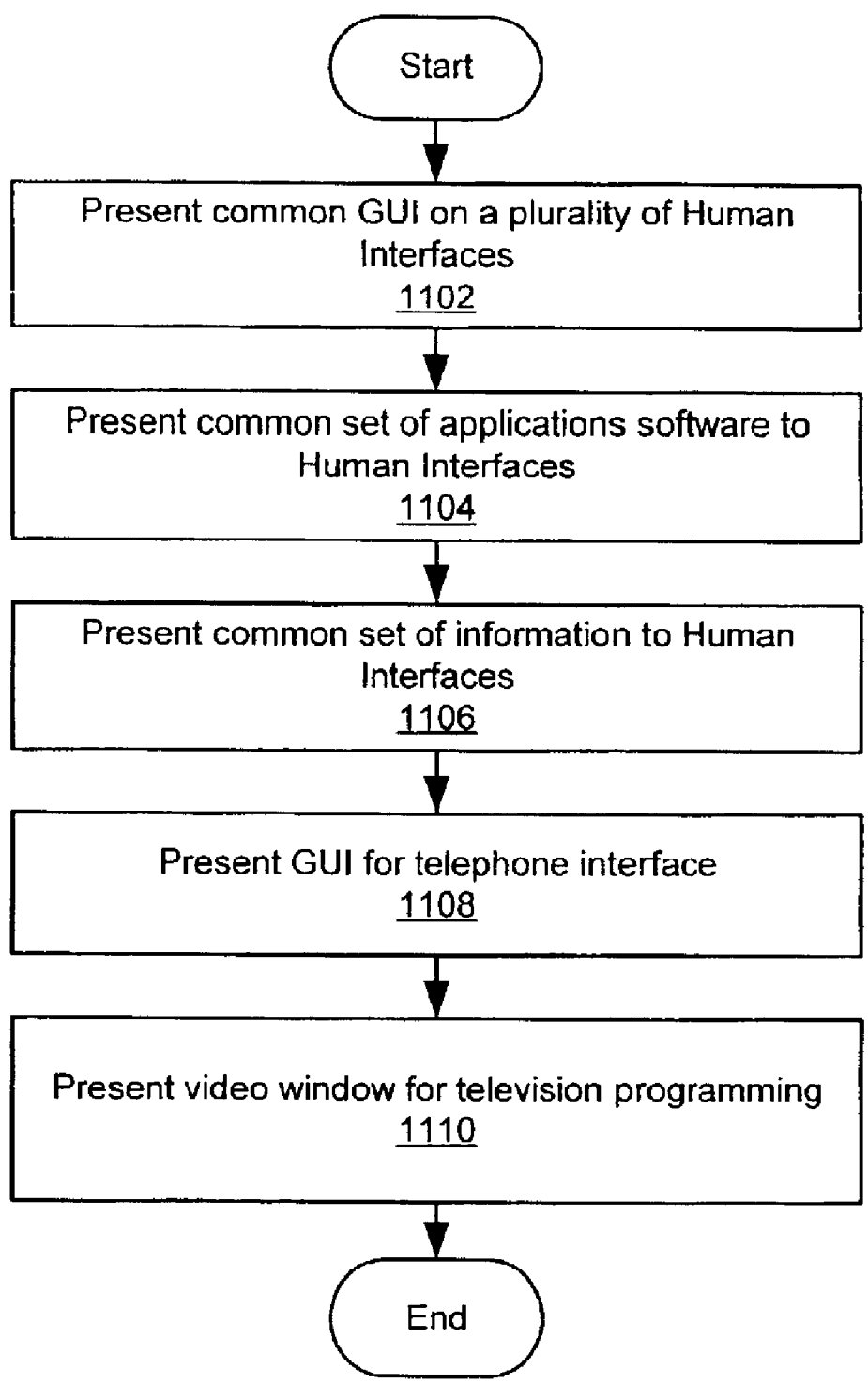
FIG. 8 is a flowchart of one embodiment of a method for providing a consistent work environment to a plurality of users, according to one embodiment.

FIG. 8—Flowchart of a Method for Providing a Consistent Work Environment:

FIG. 8 is a flowchart of one embodiment of a method for providing a consistent work environment for users of a plurality of computing systems. The computing systems may be coupled together in a network. The method described herein may be used with the various embodiments of the computing systems discussed above, as well as with other computing systems not discussed herein.

The method includes presenting a common graphical user interface (GUI) to each of a plurality of human interfaces (1102). Each of the plurality of human interfaces may be associated with one of the computing systems in the network. The GUI for each human interface may be consistent across the plurality of human interfaces such that each user interacts with the same operating system.

Through the GUI, a common set of applications software may be presented to each of the human interfaces (1104). The software applications may be stored on the plurality of computing systems that are connected to the network. The applications stored may include a word processor, a spreadsheet, an Internet web browser, an e-mail client, and virtually any other type of applications software that may be required by users of the networked computing systems.

A substantially common set of information may also be presented to each of the human interfaces (1106). In one embodiment, presenting a common set of information may include coupling a common database to the networked computing systems, such as database 405 shown in FIG. 4B. Multiple databases storing different types of data may be present in some embodiments of a network of computing systems for which the method is performed. Data stored in the database(s) may be processed using the one or more of the various types of application software that is presented to each of the human interfaces.

A telephone interface may also be presented to each of the human interfaces (1108). Using audio and/or telephone circuitry that may be present in each computing system, telephone communications may be possible between a computing system user and an external party. Telephone communications may also be possible between two different computing system users of the same network. Each human interface may be equipped with an apparatus that allows both the reception and transmission of telephone signals to and from its user. In one embodiment, a headset/microphone may be coupled to a human interface. The headset/microphone may include at least one earpiece/headphone for conveying telephone audio signals to a user and a microphone enabling a user to convey telephone audio signals to an external party. A visual interface for a telephone application may be displayed on a monitor screen of each human interface, and may include a list of phone numbers that its respective user may call.

Television programming may be presented to each of the human interfaces through a video window (1110). The television programming may include reception of both video and audio signals through supporting circuitry in the computing systems. In some embodiments, a network/system administrator may configure the network such that each computing system simultaneously receives the same television audio and video signals, and thus the same programming/channel. This may ensure that each user of the computing system is receiving substantially the same information through the television functionality present in each of the human interfaces/computing systems.

In one embodiment, the GUI's at each human interface are not modifiable by its respective user. Rather, any modifications or upgrades to the GUI or any software applications for the computing systems may be performed by an administrator at a centralized location (i.e. the cage of FIGS. 1A and 1B). This may be one method of ensuring consistency in the information that is presented to each computing system user.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system, comprising:
   a plurality of computing systems, wherein the plurality of computing systems are collocated and coupled by a network;
   a plurality of remote human interfaces, wherein each of the plurality of remote human interfaces is located at a remote user location;
   a plurality of communication links, wherein each communication link is coupled between one of the plurality of collocated computing systems and one of the plurality of remote human interfaces;
   wherein each of the plurality of collocated computing systems is operable to present on its respective remote human interface: 1) a graphical user interface for application software executing on its respective collocated computing system; 2) a graphical user interface for conducting telephone calls; and 3) a video window; and
   wherein each one of the plurality of collocated computing systems provides, on its respective remote human interface, each of the graphical user interface for the application software, the graphical user interface for conducting telephone calls, and the video window.

2. The system of claim 1, further comprising:
   a cage having a plurality of slots, wherein each of the plurality of slots is operable to receive a computer blade; and
   a plurality of computer blades, wherein each computer blade comprises one of the plurality of collocated computing systems.

3. The system as recited in claim 1, wherein each computer blade comprises:
   a frame;
   a printed circuit board mounted to the frame;
   a central processing unit (CPU) comprised on the printed circuit board;
   a memory comprised on the printed circuit board;
   a non-volatile memory comprised on the frame;
   network interface logic comprised on the printed circuit board for interfacing to a network;
   human interface logic comprised on the printed circuit board which is operable to receive two or more human interface signals and encode the two or more human interface signals into a format suitable for transmission to a remote location;
   wherein the human interface logic is further operable to receive two or more encoded human interface signals from the remote location and decode the two or more encoded human interface signals from a format suitable for transmission from the remote location;

a human interface connector coupled to the human interface logic, wherein the human interface connector is operable to couple to the one or more cables for communication of the encoded human interface signals with a remote location; and a power supply comprised on the frame, wherein the power supply is operable to couple to an external power source and supply power to the plurality of collocated computing systems.

4. The system recited in claim 3, wherein the plurality of collocated computing systems further includes a removable function module, wherein the removable function module is operable to electrically couple to at least a subset of the plurality of collocated computer blades, wherein the removable function module is operable to provide additional functionality to each of the collocated computer blades comprised in the slots of the cage.

5. The system as recited in claim 3, wherein each of the plurality of computer blades is further operable for communication of network signals with a network.

6. The system of claim 2, wherein each of the plurality of computer blades is operable to couple to one or more cables for communication of encoded human interface signals with a respective remote human interface.

7. The system of claim 1, wherein the plurality of collocated computing stems are located in the same room.

8. The system of claim 1, wherein the remote user location is at least 10 feet from the plurality of collocated computing systems.

9. The system as recited in claim 1, wherein each of the plurality of collocated computing systems is configured to display television programming from the same channel in the video window of their respective remote human interfaces.

10. The system as recited in claim 1, wherein each of the plurality of remote human interfaces presents the same graphical user interface.

11. The system as recited in claim 10, wherein the graphical user interface of each of the plurality of collocated computing systems is not modifiable by its respective user.

12. The system as recited in claim 1, wherein each of the plurality of collocated computing systems stores the same set of application software.

13. The system as recited in claim 12, further comprising a database for storing results for user interaction with the application software.

14. The system as recited in claim 13, wherein each of the plurality of collocated computing systems is configured to access the same database.

15. The system as recited in claim 1, wherein the plurality of collocated computing systems comprises a plurality of independent computing systems.

16. A system, comprising:

a plurality of computer blades, wherein each computer blade comprises one of a plurality of collocated computing systems;

a plurality of remote human interfaces, wherein each of the plurality of remote human interfaces is located at a remote user location;

a plurality of communication links, wherein each communication link is coupled between one of the plurality of collocated computing systems and one of the plurality of remote human interfaces;

wherein each of the plurality of collocated computing systems is operable to present on its remote human interface: 1) a graphical user interface for application software executing on its respective collocated computing system; 2) a graphical user interface for conducting telephone calls; and 3) a video window.

17. The system of claim 16, further comprising a cage having a plurality of slots, wherein each of the slots is operable to receive a computer blade.

18. The system claim 17, further comprising a power supply comprised on the frame, wherein the power supply is operable to couple to an external power source and supply power to the plurality of collocated computing systems.

19. The system of claim 16, further comprising a removable function module, wherein the removable function module is operable to electrically couple to at least a subset of the plurality of computer blades, wherein the removable function module is operable to provide additional functionality to each of the computer blades comprised in the slots of the cage.

20. The system as recited in claim 16, wherein each computer blade comprises:

a frame;

a printed circuit board mounted to the frame;

a CPU comprised on the printed circuit board;

a memory comprised on the printed circuit board;

a non-volatile memory comprised on the frame;

network interface logic comprised on the printed circuit board for interfacing to a network;

human interface logic comprised on the printed circuit board which is operable to receive two or more human interface signals and encode the two or more human interface signals into a format suitable for transmission to a remote human interface;

wherein the human interface logic is further operable to receive two or more encoded human interface signals from the remote human interface and decode the two or more encoded human interface signals from a format suitable for transmission from the remote human interface; and a human interface connector coupled to the human interface logic, wherein the human interface connector is operable to couple to the one or more cables for communication of the encoded human interface signals with a remote human interface.

* * * * *

UNITED STATES PATENT AND TRADEMARK OFFICE
CERTIFICATE OF CORRECTION

PATENT NO. : 6,944,826 B2
DATED : September 13, 2005
INVENTOR(S) : Thornton

It is certified that error appears in the above-identified patent and that said Letters Patent is hereby corrected as shown below:

Column 17,
Line 29, please delete "computing stems are" and substitute -- computing systems are --.

Signed and Sealed this

Thirteenth Day of December, 2005

JON W. DUDAS
*Director of the United States Patent and Trademark Office*